United States Patent Office 2,813,103
Patented Nov. 12, 1957

2,813,103

PROCESS OF TREATMENT OF VINASSES CONTAINING PYRROLIDONE CARBOXYLIC ACID

Alexander M. Zenzes, New York, N. Y.

No Drawing. Application April 13, 1954,
Serial No. 422,999

5 Claims. (Cl. 260—326.3)

The instant invention relates to the separation of pyrrolidone carboxylic acid from solutions containing it. More particularly, it relates to processes for the separation of pyrrolidone carboxylic acid, inorganic salts, and betaine from aqueous residues from which sugar has been removed, such as vinasse, schlempe, Steffen's filtrate, barium desugaring wastes from sugar beet factories, and the like.

Pyrrolidone carboxylic acid, the lactam of glutamic acid, is a constituent of many aqueous molasses residues from which the sugar has been removed. Upon hydrolysis, pyrrolidone carboxylic acid is converted to glutamic acid, from which monosodium glutamate, which is a widely used food flavor enhancer, is produced. Presently, Steffen's filtrate and concentrated schlempe from sugar beet molasses, which contain pyrrolidone carboxylic acid, are most widely employed as a raw material for the production of glutamic acid from which monosodium glutamate is prepared. However, other concentrated aqueous residues, such as vinasse and barium desugaring wastes, contain pyrrolidone carboxylic acid, a small amount of glutamic acid, and betaine in combination with a complex mixture of inorganic salts, such as potassium salts, and organic impurities. Although the concentration of pyrrolidone carboxylic acid and glutamic acid in these crude materials is ordinarily only between about 4% and about 10%, they are available in substantial quantities and it would be desirable if pyrrolidone carboxylic acid and inorganic salts, such as potash salts, which are useful as a fertilizer component, could be separated from these residues.

It is an object of the instant invention to provide processes for the separation of pyrrolidone carboxylic acid from crude solutions containing it.

It is a further object of the instant invention to provide processes for the separation of pyrrolidone carboxylic acid, betaine, and useful inorganic salts from aqueous molasses residues from which sugar has been removed either by fermentation or in the form of an insoluble salt, such as an alkaline earth metal saccharate.

It is a further object of the instant invention to provide feasible processes for the separation of pyrrolidone carboxylic acid, betaine, and useful potassium salts from vinasse, barium desugaring wastes, schlempe, Steffen's filtrates, and the like.

These and other objects of the instant invention will become more apparent as hereinafter described.

The instant novel process involves the separation of pyrrolidone carboxylic acid from solutions containing it along with alkali metal salts. For example, in a specific embodiment of the instant invention, an aqueous beet molasses residue from which the sugar has been removed either by fermentation or as an insoluble salt is mixed with sufficient acid, the anion of which forms an insoluble salt with alkali metals, to adjust the pH to below about 3.5. A sufficient amount of an aliphatic monohydric water soluble alcohol is then mixed with the acidified solution to precipitate inorganic salts. Generally, between about 1 and about 4 parts of the aliphatic monohydric water soluble alcohol per part of the acidified solution is employed. The resulting precipitate which forms is separated from the solution and contains inorganic salts.

The alcoholic solution from which the precipitate has been separated is adjusted to a pH between about 9.0 and about 12.0 with a metal hydroxide, the cation of which forms a sparingly soluble salt with the pyrrolidone carboxylic acid in the aqueous alcoholic medium. The precipitate containing the pyrrolidonate is separated from the solution, for example by filtration.

In a more specific embodiment of the instant invention, sufficient acid, the anion of which forms an insoluble salt of alkali metals under the prevailing conditions, such as sulfuric acid, is admixed with an aqueous substantially sugar-free molasses residue, such as vinasse, to adjust the pH to below about 3.0, preferably to between about 1.5 and about 3.5. Between about 1 part and about 4 parts of an aliphatic monohydric water soluble alcohol, such as methyl alcohol, or ethyl alcohol, or mixtures thereof, preferably ethyl alcohol, is added to the adjusted solution. The resulting suspension is thoroughly mixed, and the resulting precipitate containing inorganic salts, such as potassium sulfate, is separated, for example by filtration. This inorganic sulfate cake is useful as a fertilizer material.

The resulting solution from which the inorganic cake has been separated is then treated with sufficient metal hydroxide, the cation of which forms a sparingly soluble salt with pyrrolidone carboxylic acid under the conditions obtaining, to produce a pH between about 9.0 and about 12.0. For example, an alkaline earth metal hydroxide, such as barium hydroxide, calcium hydroxide, strontium hydroxide, but preferably barium hydroxide is added to the resulting solution in sufficient amount to adjust the pH to between about 9.0 and about 12.0, preferably to about 12.0. Pyrrolidone carboxylic acid precipitates as the salt of the alkaline earth metal and is separated from the solution, for example by filtration.

In one embodiment of the instant invention, additional alcohol is added to the suspension which has been adjusted to a pH between about 9.0 and about 12.0 until no additional material precipitates. The resulting precipitate is separated, for example by filtration. The alcohol is removed from the solution from which the precipitate has been separated, for example by distillation.

In order to recover pyrrolidone carboxylic acid from the alkaline earth metal-containing precipitate, the precipitate is dissolved in water, and the alkaline earth metal ion is separated by adding a reagent with which it forms a water insoluble salt, such as sulfuric acid, or the like. The resulting insoluble salt is separated, for example by filtration, and the resulting solution contains the pyrrolidone carboxylic acid. When desired, the pyrrolidone carboxylic acid in the solution is converted to glutamic acid, in the conventional manner, by hydrolysis in the presence of either acid or alkali, and the glutamic acid is crystallized and separated from the resulting solution in any conventional manner, for example by isoelectric crystallization at a pH between about 2.5 and about 3.5, preferably between about 3.0 and about 3.3.

The instant invention is applicable for the separation of pyrrolidone carboxylic acid from raw materials containing it in the presence of impurities. For example, aqueous molasses residues from which the sugar has been at least partially removed, such as Steffen's filtrate, and vinasse; concentrated schlempe from alcohol fermentations; concentrated filtrates from the manufacture of yeast; concentrated schlempe from the beet molasses desugarization juices according to the barium process; and the like, are treated according to the instant invention. These pyrrolidone carboxylic acid-containing solutions generally also contain valuable basic nitrogen compounds, such as betaine, which if desired, are also recovered in practicing the instant invention. A further embodiment of the instant invention involves the removal of basic nitrogen compounds from the acidic pyrrolidone carboxylic acid-containing solution, from which the inorganic precipitate has been separated, but prior to precipitation of the metal pyrrolidonate. For example, betaine is recovered from the acidic solution prior to the separation of the pyrrolidone carboxylic acid by adsorption on a suitable ion exchange material or other conventionally employed material used for the adsorption of basic nitrogen compounds. Conventional ion exchange materials, such as Amberlite IR-120, Amberlite IR-100, Amberlite IR-112 (by Rohm and Haas), or Dowex 50 (by Dow Chemical Co.), are employed for the separation of betaine from the pyrrolidone carboxylic acid-containing solution. The composition and use of these and other conventional resins are described in "Ion Exchange Resins," Keenan and Myers, John Wiley & Sons, 1950, pp. 58–59.

In another embodiment of the instant invention, a hydrous silica selected from the vermiculite or montmorillonite types, which removes cationic ammonium bases and impurities from the solution with exchangeable hydrogen ions or sodium ions is added to the acid-containing solution from which the inorganic precipitate has been separated. The preferred material of this type is a hydrous silicate of the vermiculite type and illustrated by, but not limited to, a product of the type shown in the following structural formula.

Other materials which may be employed are batavite or hydrous vermiculite, which contain exchangeable sodium ions. It has been observed that betaine and impurities present in the solution are occluded within the layers or pores of activated batavite, vermiculite, or bentonite, when the mixture is heated, for example at a temperature between about 40° C. and about 80° C. for between about 10 minutes and about 20 minutes. For this reason, more betaine is taken up than is to be expected from the quantity of exchangeable sodium present. The solid material containing the adsorbed betaine is then separated from the solution and can be treated with calcium hydroxide or barium hydroxide, so that betaine is liberated and recovered. The solution containing pyrrolidone carboxylic acid and glutamic acid is then adjusted to a pH between about 9.0 and about 12.0 as above described and the precipitate containing pyrrolidone carboxylic acid and organic acids are separated.

In another embodiment of the instant process, sufficient sulfuric acid is added to a pyrrolidone carboxylic acid-containing solution, such as vinasse, to adjust the pH to between about 2.0 and about 3.5, then between about 1 part and about 2 parts of ethyl alcohol or between about 2 parts and about 3 parts of methyl alcohol per part or vinasse is admixed with the adjusted mixture. The insoluble solids containing potassium sulfate are separated from the solution, for example by filtration. Betaine is recovered from the resulting filtrate by contacting the same with an ion exchange resin, such as Amberlite IR–120 (by Rohm and Haas), which is a nuclear sulfuric type cation exchange material. Betaine is eluted from the ion exchange material, for example with a dilute aqueous solution of sulfuric acid and recovered from the resulting eluate in any conventional manner. The resulting alcoholic pyrrolidone carboxylic acid-containing solution, from which the betaine has been separated is then adjusted to a pH of about 12.0 with barium hydroxide. The sparingly soluble precipitate containing barium pyrrolidonate is separated from the resulting solution, for example by filtration. The barium is separated from the pyrrolidone carboxylic acid by suspending the precipitate in water and treating the solution with sulfuric acid. The barium sulfate which precipitates is separated from the solution, for example by filtration. The filtrate contains the pyrrolidone carboxylic acid from which glutamic acid and mono-sodium glutamate are ultimately recovered, for example by hydrolyzing the pyrrolidone carboxylic acid present to glutamic acid with acid and crystallizing glutamic acid from the resulting hydrolyzate.

The following examples are presented in order to afford a clearer understanding of the practice of the instant invention, but it is understood that they are illustrative only and there is no intention to limit the invention thereto.

*Example I*

About 2 parts of ethyl alcohol (100 grams) were admixed with about 1 part of vinasse (50 grams), and the resulting alcoholic solution was adjusted to a pH between about 2.0 and about 3.0 with sulfuric acid. The inorganic cake which formed was separated from the resulting solution by filtration. Sufficient barium hydroxide was added to the resulting solution to obtain a pH of about 12.0, and the resulting precipitate containing barium pyrrolidone carboxylate was separated by filtration. The barium pyrrolidone carboxylate contained about 88% of the pyrrolidone carboxylic acid originally present in the vinasse.

The procedure described above was repeated with the exception that the acidic filtrate from which inorganic salts had been separated was adjusted to a pH of 9.0, rather than 12.0, with the barium hydroxide. About 80% of the pyrrolidone carboxylic acid originally present in the vinasse was present in the cake which was separated from the adjusted solution.

*Example II*

About 1 part of vinasse (50 grams) was admixed with about 1 part by weight of ethyl alcohol (50 grams), and the resulting alcoholic solution was adjusted to a pH between about 2.5 and about 3.0 with sulfuric acid. The inorganic cake which formed was separated from the resulting solution by filtration. Sufficient calcium hydroxide was added to the resulting solution to obtain a pH of about 12.0, and the resulting precipitate containing calcium pyrrolidonate was separated by filtration. The calcium pyrrolidonate cake contained about 78% of the pyrrolidone carboxylic acid originally present in the vinasse.

The procedure described above was repeated with the exception that the acidic filtrate from which inorganic salts had been separated was adjusted to a pH of 9.0, rather than 12.0, with the calcium hydroxide. About 50% of the pyrrolidone carboxylic acid originally present in the vinasse was present in the cake which was separated from the adjusted solution.

*Example III*

About 1 part of vinasse (500 grams) was admixed with about 4 parts by weight of methyl alcohol (2 kilograms), and the resulting alcoholic solution was adjusted to a pH between about 2.5 and about 3.0 with sulfuric acid. The inorganic cake which formed was separated from the resulting solution by filtration. Sufficient barium hydroxide was added to the resulting solution to obtain a pH of about 12.0, and the resulting precipitate containing barium pyrrolidonate was separated by filtration. The precipitate contained about 72% of the pyrrolidone carboxylic acid originally present in the vinasse together with some other solids.

The procedure described above was repeated with the exception that the acidic filtrate from which inorganic salts had been separated was adjusted to a pH of 9.0, rather than 12.0, with the barium hydroxide. About 65% of the pyrrolidone carboxylic acid originally present in the vinasse was present in the cake which was separated from the adjusted solution.

Having thus fully described and illustrated the character of the instant invention, what is desired to be protected by Letters Patent is:

1. A process for the treatment of an aqueous sugar beet molasses residue from which the sugar has been at least partly removed, said aqueous residue comprising pyrrolidone carboxylic acid and inorganic alkali metal salts, which comprises adjusting the pH of said aqueous residue to below about 3.5 with an acid, the anion of which forms an alcohol insoluble alkali metal salt, adding sufficient monohydric aliphatic water-miscible alcohol to precipitate the inorganic salts therefrom, separating the resulting precipitate from the solution, adjusting the pH of the resulting alcoholic solution of pyrrolidonecarboxylic acid to between about 9.0 and about 12.0 with an alkaline earth metal hydroxide, whereby an alkaline earth metal salt of pyrrolidonecarboxylic acid is formed which is only sparingly soluble in the presence of said alcohol, and separating the resulting precipitate of alkaline earth metal pyrrolidonecarboxylate from the solution.

2. A process for the treatment of an aqueous sugar beet molasses residue from which the sugar has been at least partially removed, said aqueous residue containing pyrrolidonecarboxylic acid and inorganic alkali metal salts, which comprises adjusting the pH of said aqueous residue to between about 1.5 and about 3.5 with sulfuric acid, adding sufficient alcohol selected from the group consisting of ethyl alcohol and methyl alcohol to precipitate the alkali metal salts therefrom, separating the resulting precipitate from the solution, adjusting the pH of the resulting alcoholic solution of pyrrolidonecarboxylic acid to between about 9.0 and about 12.0 with an alkaline earth metal hydroxide, whereby an alkaline earth metal salt of pyrrolidonecarboxylic acid is formed which is only sparingly soluble in the presence of said alcohol, and separating the resulting precipitate of alkaline earth metal pyrrolidonecarboxylate from the solution.

3. A process for the treatment of an aqueous sugar beet molasses residue from which the sugar has been at least partially removed, said aqueous residue containing pyrrolidonecarboxylic acid, betaine, and inorganic alkali metal salts, which comprises adjusting the pH of said aqueous residue to between about 1.5 and about 3.5 with an acid, the anion of which forms an alcohol insoluble alkali metal salt, adding sufficient monohydric aliphatic water-miscible alcohol to the adjusted solution to precipitate alkali metal salts, separating the precipitated salts therefrom, contacting the resulting alcoholic solution with material capable of absorbing cationic nitrogen bases from the solution, recovering betaine from said material, adjusting the resulting alcoholic solution of pyrrolidonecarboxylic acid to a pH between about 9.0 and about 12.0 with an alkaline earth metal hydroxide, and separating the resulting precipitate of alkaline earth metal pyrrolidonecarboxylate from the solution.

4. The process of claim 3 wherein said material capable of absorbing cationic nitrogen bases is a hydrous silica material selected from the group consisting of activated vermiculite, bentonite, batavite, and montmorillonite.

5. A process for the treatment of vinasses containing pyrrolidone carboxylic acid which comprises adjusting the pH of said solution to between about 1.5 and about 3.5 with sulfuric acid, adding sufficient alcohol selected from the group consisting of methyl alcohol, ethyl alcohol, and mixtures thereof, to the adjusted solution to precipitate alkali metal salts, separating the precipitated salts therefrom, contacting the resulting solution with a hydrous silica material selected from the group consisting of a hydrous vermiculite, bentonite, and montmorillonite containing exchangeable sodium ions, recovering betaine from the hydrous silica, adjusting the resulting solution from which betaine has been separated to a pH between about 9.0 and about 12.0 with an alkaline earth metal hydroxide selected from the group consisting of barium hydroxide and calcium hydroxide, and separating the resulting precipitate from the solution.

References Cited in the file of this patent
UNITED STATES PATENTS

| Number | Name | Date |
|---|---|---|
| 1,973,574 | Marshall | Sept. 11, 1934 |
| 2,295,600 | Natelson et al. | Sept. 15, 1942 |
| 2,434,715 | Olcott et al. | Jan. 20, 1948 |
| 2,510,980 | Jacobs et al. | June 13, 1950 |
| 2,519,573 | Hoglan | Aug. 22, 1950 |
| 2,528,047 | Fitch | Oct. 31, 1950 |
| 2,543,345 | Waller et al. | Feb. 27, 1951 |
| 2,738,353 | Blish | Mar. 13, 1956 |